United States Patent [19]
Wallace et al.

[11] Patent Number: 5,769,059
[45] Date of Patent: Jun. 23, 1998

[54] ELONGATED FUEL-AIR BYPASS FOR INTERNAL CONBUSTION ENGINE

[76] Inventors: William K. Wallace; Florence W. Wallace, both of 131042 Kahukai St., Leilani Estates, Pahoa, Hi. 96778

[21] Appl. No.: 808,533

[22] Filed: Feb. 28, 1997

Related U.S. Application Data

[63] Continuation of Ser. No. 541,097, Oct. 11, 1995, Pat. No. 5,606,956.

[51] Int. Cl.$^6$ .................................................. F02M 31/02
[52] U.S. Cl. ..................... 123/545; 123/590; 123/25 E; 123/25 F
[58] Field of Search .................................. 123/545, 546, 123/547, 585, 590, 25 A, 25 B, 25 R, 25 E, 25 F; 261/144, 145; 48/189.2, 189.3

[56] References Cited

U.S. PATENT DOCUMENTS

| | | |
|---|---|---|
| 4,137,875 | 2/1979 | Medina . |
| 4,200,070 | 4/1980 | Racine . |
| 4,286,465 | 9/1981 | Van Tuyl . |
| 4,300,513 | 11/1981 | Ray . |
| 4,355,623 | 10/1982 | Graham . |
| 4,476,817 | 10/1984 | Lindberg . |
| 4,478,198 | 10/1984 | Bruhn ....................................... 123/590 |
| 4,770,151 | 9/1988 | Finlay . |
| 5,040,518 | 8/1991 | Hamm . |
| 5,046,475 | 9/1991 | Thompson . |
| 5,353,772 | 10/1994 | Wallace et al. . |
| 5,396,866 | 3/1995 | Kuntz ...................................... 123/25 B |
| 5,606,956 | 3/1997 | Wallace et al. ........................... 123/545 |

*Primary Examiner*—Erick R. Solis
*Attorney, Agent, or Firm*—Wenderoth, Lind & Ponack, L.L.P.

[57] ABSTRACT

An elongated fuel-air bypass is connected between an outlet port of a fuel-air mixing device and an inlet port of an intake manifold of an internal combustion engine. The elongated bypass apparatus includes an elongated bypass conduit formed of a thermally conductive material and which has sufficient length, exterior surface area and thermal conductivity to enable it to cause liquid fuel introduced through the fuel-air mixing device to change from a liquid state to a gaseous state prior entry into the one or more cylinders of the internal combustion engine. Turbulence creating mechanisms, such as venturis or baffles, are provided in the elongated bypass conduit for creating turbulence in the fuel-air mixture flowing therethrough. An after-air supply tube is provided to supply after-air near an upstream end of the fuel-air bypass conduit, and is controlled by an after-air valve to provide for a lean fuel-air mixture. Also provided is a liquid additive system for supplying water and/or alcohol into the fuel-air bypass conduit. A start-up fuel injection system is provided to inject a burst of fuel into the fuel-air bypass conduit at initial start-up of the internal combustion engine. At least one reparticulation reservoir is provided in the bottom of a portion of the fuel-air bypass conduit in order to enable quick start-up of the engine after flooding.

18 Claims, 10 Drawing Sheets

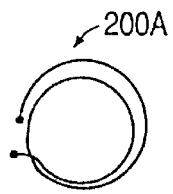 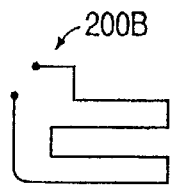 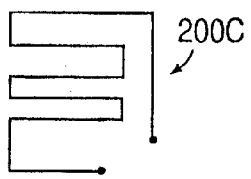
FIG. 29A   FIG. 29B   FIG. 29C
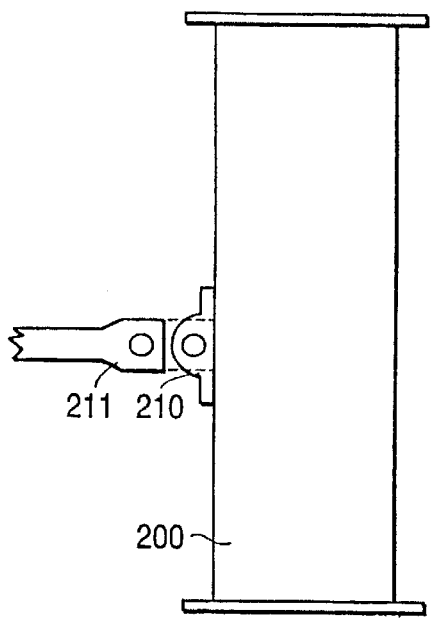 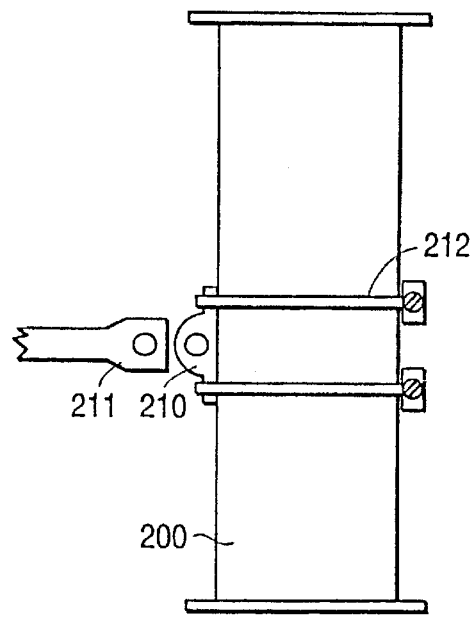
FIG. 24   FIG. 25
FIG. 26
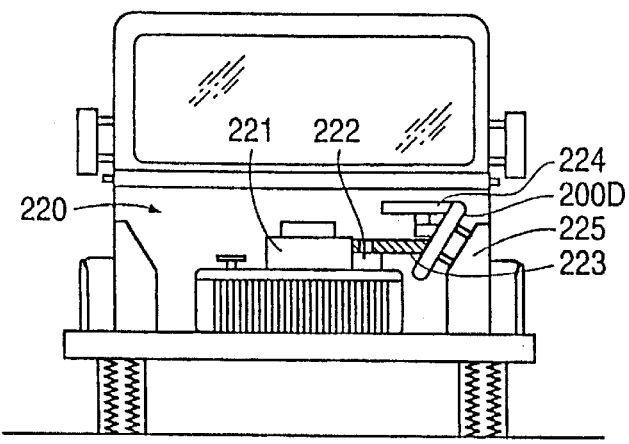

ELONGATED FUEL-AIR BYPASS FOR INTERNAL CONBUSTION ENGINE

This is a continuation application of Ser. No. 08/541,097, filed Oct. 11, 1995 U.S, Pat. No. 5,606,956.

BACKGROUND OF THE INVENTION

The invention relates generally to improvements in internal combustion engines and, more particularly, to an elongated fuel-air bypass device for use between a fuel-air mixing device and an intake manifold of an internal combustion engine.

Although many improvements have been proposed over the years for the basic internal combustion engine, it has remained the case that the fuel (e.g. gasoline) supplied into the cylinder or cylinders of the internal combustion engine has been a wet saturated fuel. That is, in carburetor engines and throttle body fuel injector engines, liquid fuel is drawn or pumped into an air stream in the throat of the fuel-air mixing device, in order create a fuel-air mixture. This fuel-air mixture is fed directly into the intake manifold and, in turn, into the individual cylinders of the internal combustion engine. In a multi-port fuel injection engine, the liquid fuel is sprayed into the cylinders in an atomized form by the fuel injectors. In any event, the fuel-air mixture entering the cylinders in prior art internal combustion engines has been a mixture of air and wet saturated fuel.

Although the multi-port fuel injection system is an improvement over the carburetor system and has been shown to be approximately 6% more efficient, this increase in efficiency is attained due to a better control of the fuel-to-air ratio. That is, there is no real improvement in the actual combustion of the fuel, but only in the monitoring of the fuel-air ratio under different load conditions, such as during coasting or deceleration.

Wet saturated fuel does not burn. Rather, the wet saturated fuel must be prepared for burning by being vaporized (or gasified). In the prior art internal combustion engines, this vaporization of the fuel has occurred in the cylinder due to the heat of compression and combustion.

Therefore, because the fuel must change state from liquid to gas prior to it being combusted in the cylinder, complete combustion of the fuel is not possible. Therefore, improvements in the efficiency of internal combustion engines to date have been severely limited.

Engine efficiency has also been disadvantageously affected in today's automobiles because of the federal laws preventing the use of leaded gasoline. That is, engines with higher compression ratios will tend to cause preignition or "knocking." This knocking was, however, eliminated by use of tetryl ethyl lead in gasoline (i.e., leaded gasoline). The lead in the gasoline was used to slow the burning of the gasoline and thus slow the movement of the flame front, thereby preventing knocking. When leaded gasolines were outlawed, it became necessary to reduce the compression ratios of new engines in order to prevent the engines from knocking when using the unleaded gasoline. The use of lower compression ratios results in a decreased engine performance and efficiency.

Air pollution due to hydrocarbon and carbon monoxide emissions of internal combustion engines is becoming an increasing concern, especially in metropolitan areas. The major attempts thus far to reduce emissions have been by using lean burn engines and by providing air-cleaning devices, such as the catalytic convertor, downstream of the engine. Although these innovations have proven somewhat successful, the ability to reduce emissions in this manner is limited.

Another problem in prior art internal combustion engines is that of engine flooding, wherein a surplus of liquid fuel becomes present in the engine due to the continual infeed of liquid fuel prior to initial ignition of the fuel.

Various attempts have been made to improve the performance and efficiency of internal combustion engines, but such attempts have been either impractical, or only mildly successful. In U.S. Pat. No. 4,478,198, a fuel treating apparatus is disclosed whereby a dual-compartment insert unit is interposed between the carburetor and the intake manifold of an internal combustion engine, and an elongated conduit is attached between an outlet port of the upstream compartment and an inlet port of the downstream compartment. A heat exchanger and baffle arrangement is provided to heat and cause mixing of the fuel-air mixture traveling through the conduit. However, the fuel treating apparatus of this U.S. patent endeavors only to improve atomization of the fuel-air mixture and, accordingly, the conduit is of a relatively small diameter and cannot accommodate all of the fuel-air flow output from the carburetor. Therefore, a valved bypass opening must be provided between the upstream and downstream compartments to allow for direct fuel-air flow from the carburetor to the intake manifold. This arrangement is thus beset by the same disadvantage as discussed above. In particular, this arrangement continues the prior art concept of feeding a mixture of air and wet saturated fuel into the cylinders of the internal combustion engine. Therefore, it remains necessary for the fuel entering the cylinders to be prepared for burning by being gasified in the cylinders by heat of compression and combustion. In addition, this arrangement is beset by the problem that, if the fuel-air mixture is not allowed to readily flow through the bypass so as to pass directly from the carburetor to the intake manifold, the small diameter of the conduit will effectively starve the engine of the needed fuel-air mixture.

U.S. Pat. No. 4,200,070 is directed to a fuel-air mixture control for supercharged internal combustion engines. In this patent, a supercharger is interposed between an induction conduit leading from the carburetor and an induction conduit leading to the intake manifold. A straight vertical bypass tube bypasses the supercharger so that the fuel-air mixture will pass directly from the carburetor to the intake manifold during idling, and such straight vertical tube is provided directly above a heat transfer plate which is heated by exhaust gases. With this arrangement, any precipitated liquid fuel will drop through the straight vertical tube and onto the heat transfer plate to be vaporized. However, this invention also is beset by the same problem as discussed above. That is, the fuel-air mixture introduced into the intake manifold and the cylinders from the carburetor is a mixture of air and wet saturated fuel. Therefore, as with the other prior art, the liquid fuel must be prepared in the cylinder by being vaporized therein due to heat of compression and combustion, thereby reducing the performance and efficiency of the engine.

Other attempts for improving the performance and/or efficiency of internal combustion engines are disclosed in U.S. Pat. Nos. 5,046,475, 4,355,623, 4,770,151, 4,300,513, 4,286,564, 4,137,875 and 5,040,518. However, these attempts have not presented solutions adequate to overcome the above-described disadvantages of the prior art.

SUMMARY OF THE INVENTION

An object of the present invention is to overcome the above-described disadvantages inherent in the prior art.

A particular object of the present invention is to considerably improve the performance and efficiency of an internal combustion engine by causing the fuel-air mixture delivered into the cylinders of the internal combustion engine to be in gaseous form rather than in a wet saturated form.

A further object of the invention is to reduce air pollution by reducing carbon monoxide and hydrocarbon emissions from an internal combustion engine.

Another object of the invention is to enable the use of internal combustion engines having higher compression ratios than can currently be used with unleaded gasoline, by providing an arrangement which allows the addition of water and/or alcohol into the fuel-air mixture to be burned in the cylinders.

A still further object of the present invention is to facilitate quick starting of an internal combustion engine after it has been flooded, by providing at least one reparticulation reservoir in a fuel-air bypass conduit according to the present invention.

Yet another object of the present invention is the provision of a backfire safety device which will allow for the absorption of high pressures created by backfiring.

An additional object of the present invention is to create a lean fuel-air mixture by supplying after-air into the bypass conduit.

The above and other objects and advantages are attained according to the present invention by the use of a fuel-air bypass apparatus in an internal combustion engine, wherein the bypass apparatus comprises an elongated bypass conduit operably coupled between the outlet port of a fuel-air mixing device and the inlet port of an intake manifold for passing a fuel-air mixture from the fuel-air mixing device to the intake manifold, turbulence creating means for creating turbulence in the fuel-air mixture flowing through the elongated bypass conduit, wherein the elongated bypass conduit is formed of a thermally conductive material, and wherein the elongated bypass conduit has a length, an exterior surface area and a thermal conductivity sufficiently great so as to constitute a means for causing liquid fuel introduced through the fuel-air mixing device to change from a liquid state to a gaseous state prior to entry into the at least one cylinder.

In a preferred form of the invention, the elongated bypass conduit is formed of copper to provide for great thermal conductivity. The turbulence creating means can be formed by a plurality of venturis provided in the elongated bypass conduit successively along the length thereof, or by a plurality of baffles provided in the elongated bypass conduit successively along the length thereof.

The minimum cross-sectional area of the elongated bypass conduit should be at least as great as the minimum cross-sectional area of the throat of the fuel-air mixing device. The elongated bypass conduit can be circular or rectangular in cross-section, or can have any other suitable cross-sectional shape.

The apparatus further includes a liquid additive system for supplying at least one liquid additive into the fuel-air bypass conduit to mix with the fuel-air mixture flowing therethrough. The liquid to be mixed with the fuel-air mixture can be water, alcohol or water and alcohol.

The apparatus further includes a start-up fuel injection system for injecting a burst of fuel into the fuel-air bypass conduit at initial start-up of the internal combustion engine. Also, at least one reparticulation reservoir is provided in a bottom of a portion of the fuel-air bypass conduit, in order to enable quick starting of the engine after flooding thereof.

The fuel-air bypass apparatus also includes a backfire safety device including a backfire safety port formed in the fuel-air bypass conduit, a safety port cover hinged to the fuel-air bypass conduit to cover the backfire safety port, and a biasing spring biasing the safety port cover toward a closed condition over the backfire safety port. A pressure discharge absorbing canister is connected to the backfire safety port by a pressure discharge pipe.

The fuel-air bypass conduit of the present invention can be formed as a single piece conduit, or can be formed of a plurality of conduit sections longitudinally successively secured together.

The bypass conduit can also be configured in many different ways, for example, in a coil-shape or in a zig-zag shape, so long as the configuration enables the bypass conduit to be installed in a desired environment and allows the conduit to be heated, preferably with heat from the internal combustion engine.

Additional objects and advantages of the present invention will be recognized upon a reading of the following detailed description of the invention with reference to the accompanying drawing figures.

BRIEF DESCRIPTION OF THE DRAWINGS

FIG. 24 shows one embodiment of a mounting arrangement for the fuel-air bypass of the present invention;

FIG. 25 shows another embodiment of a mounting arrangement for the fuel-air bypass of the present invention;

FIG. 26 shows a fuel-air bypass arrangement according to the present invention installed in an automobile;

FIGS. 29A–29C schematically depict three alternative configurations for the fuel-air bypass conduit according to the present invention.

DETAILED DESCRIPTION OF THE INVENTION

Figure 1:
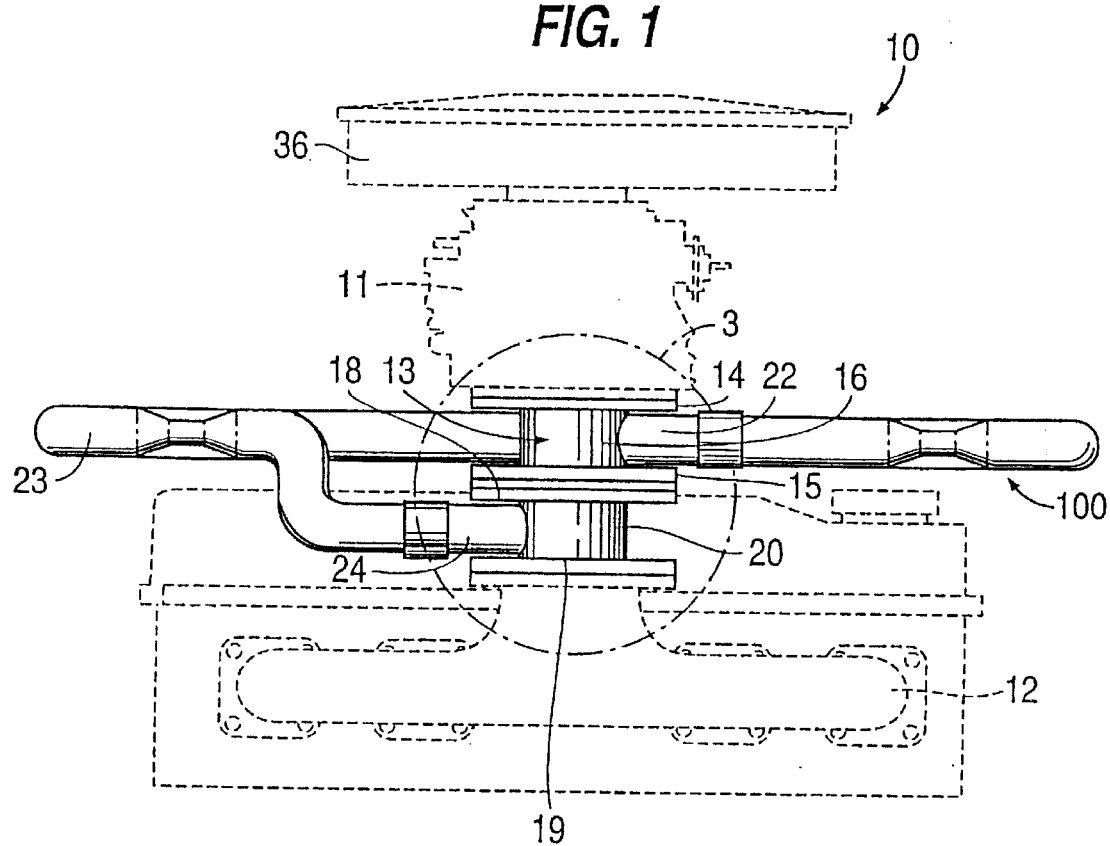
FIG. 1 shows a front elevation view of an embodiment of the fuel-air bypass of the present invention.

Various embodiments and features of the fuel-air bypass arrangement according to the present invention will now be described in detail with reference to the drawings. It is to be noted that various embodiments of the overall arrangement of the fuel-air bypass of the present invention are shown and described, and also that various embodiments of individual features of the fuel-air bypass arrangement of the present invention are shown and described. It is contemplated that the various alternative embodiments of the individual features can be used in various combinations including combinations not particularly described and shown. In addition, it is to be noted that the present invention encompasses both a fuel-air bypass device in combination with an internal combustion engine, and the fuel-air bypass device itself in its various forms. It is further contemplated that the fuel-air bypass device of the present invention will be useful as original equipment in automobiles, as well as in the form of retrofit kits for improving an internal combustion engine subsequent to original manufacturer. The present invention also contemplates a method of operating the fuel-air bypass device.

A first detailed embodiment of the fuel-air bypass device, generally indicated at 10, and its particular mounting system for mounting to an internal combustion engine will now be described with reference to FIGS. 1–4.

In this embodiment, a fuel-air bypass conduit 100 is mounted between an outlet of a fuel-air mixing device 11 (for example, a carburetor or a throttle body fuel injector) and an inlet of an intake manifold 12 of an internal combustion engine. Reference numeral 36 refers to an air cleaner. The fuel-air bypass conduit 100 is mounted between the fuel-air mixing device 11 and the intake manifold 12 by a connector saddle shown generally by reference numeral 3 and depicted in more detail in FIG. 3.

In particular, the connector saddle 3 includes a first chamber housing 13 having a first housing top flange 14, a first housing bottom flange 15 and a first housing sidewall 16 interconnected between the first housing top flange 14 and the first housing bottom flange 15. The first housing top flange 14 is secured to the fuel-air mixing device 11 by any suitable means, such as bolts or the like. The connector saddle 3 also includes a second chamber housing 17 which includes a second chamber housing top flange 18, a second chamber housing bottom flange 19 and a second chamber housing sidewall connecting between the second chamber housing top flange 18 and the second chamber housing bottom flange 19. The second chamber housing bottom flange 19 is secured to the intake manifold 12 by any suitable means, such as bolts or the like. An impermeable block-off plate 21 is interposed between the first housing bottom flange 15 and the second housing top flange 18 in order to prevent flow of the fuel-air mixture between the first chamber 13 and the second chamber 17.

The connector saddle 3 also includes a first tube 22 extending radially outwardly from the first chamber 13, and a second tube 24 extending radially outwardly from the second chamber 17. A central conduit 23 extends between the outlet tube 22 and the inlet tube 24, thereby completing the bypass conduit 100 fluidically connected between the outlet of the fuel-air mixing device 11 and the inlet of the intake manifold 12.

Figure 2:
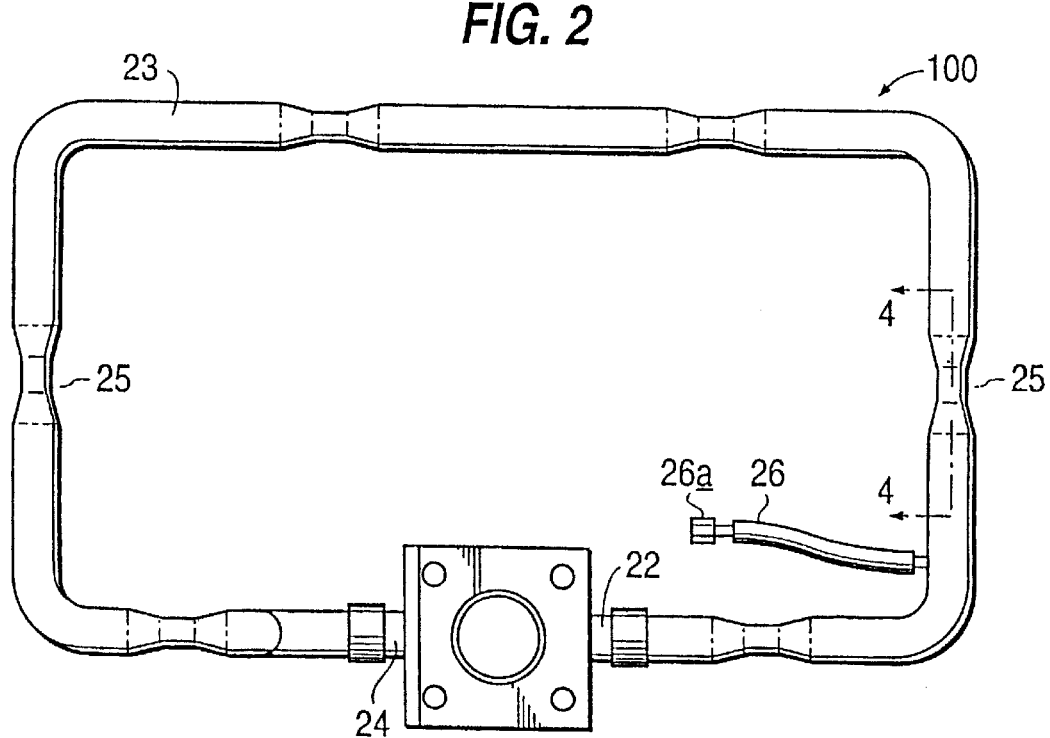
FIG. 2 shows a plan view of the embodiment of FIG. 1.
Figure 3:
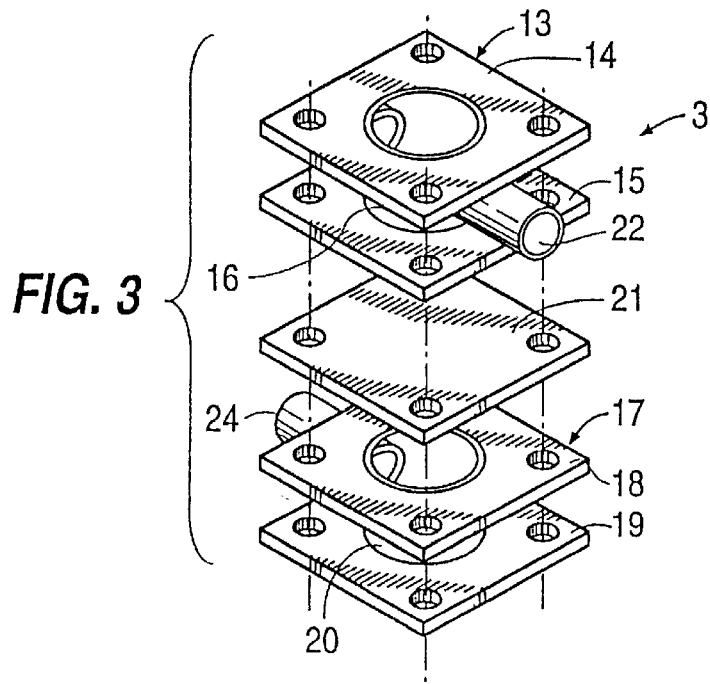
FIG. 3 shows an exploded perspective view of a connecting saddle for connecting a fuel-air bypass of FIG. 1 to an internal combustion engine.
Figure 4:
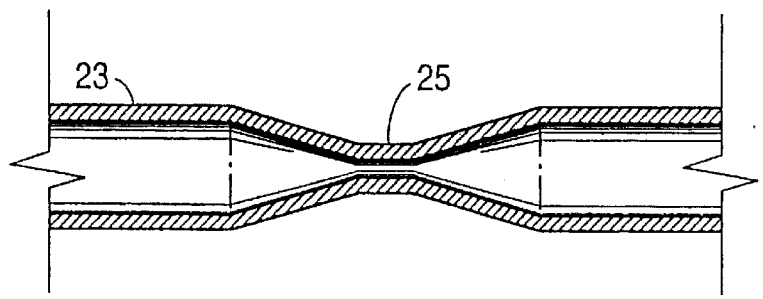
FIG. 4 shows a venturi section of the fuel-air bypass.

As seen best in FIG. 2, the bypass conduit 100 includes a plurality of venturis 25 which constitute turbulence creating means. It will be understood that some or all of the venturis 25 can be replaced by other turbulence creating means, such as various baffle configurations or various other conduit deformations, as will be described in more detail later. The venturis, or other turbulence creating means, are necessary for breaking up the boundary layer of the fuel-air flow and thereby ensuring proper mixing of the fuel-air mixture.

The connector saddle 3 can be formed of any material which can withstand the normal running conditions of an internal combustion engine, but would preferably be formed of metal, such as steel or copper. The conduit 100 is formed of a metal having a high thermal conductivity so as to provide good heat conduction from the ambient environment in the engine compartment to the fuel-air mixture flowing through the conduit 100. Accordingly, although a steel conduit has proven somewhat effective under certain conditions, forming the conduit 100 of copper has proven far superior due to the fact that the thermal conductivity of copper is approximately 10 times greater than the thermal conductivity of steel. In particular, copper has a thermal conductivity of 224 Btu/h×ft×°F, whereas a mild steel has a thermal conductivity of 26 Btu/h×ft×°F. Another critical feature of the present invention is the length, cross-sectional area and exterior surface area of the fuel-air bypass conduit. In particular, the elongated bypass conduit 100 must have a length, an exterior surface area and a thermal conductivity sufficiently great so as to constitute a means for causing liquid fuel introduced through the fuel-air mixing device to change from a liquid state to a gaseous state prior to entry into the cylinders of the internal combustion engine. It is also important that the minimum cross-sectional area of the conduit 100 (e.g. the cross-sectional area at the venturis 25) is at least as large as a minimum cross-sectional area of the flow passage of the fuel-air mixing device 11, in order to ensure the least possible resistance to flow of the fuel-air mixture through the conduit 100. Specific examples of conduit configurations used with particular internal combustion engines will be described below.

After-air is preferably added into the fuel-air bypass conduit 100 downstream of the fuel-air mixing device 11 through the after-air supply tube 26. An after-air valve 26a is provided for controlling the after-air quantity. The after-air valve 26a can be any suitable valve, such as a slide valve or a rotary valve. Details of after-air control will be set forth below.

Figure 5:
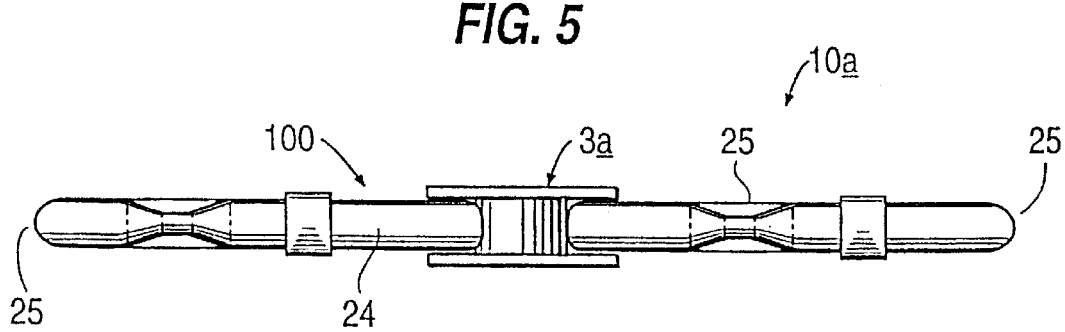
FIG. 5 shows a front elevation view of a second embodiment of the fuel-air bypass of the present invention.
Figure 6:
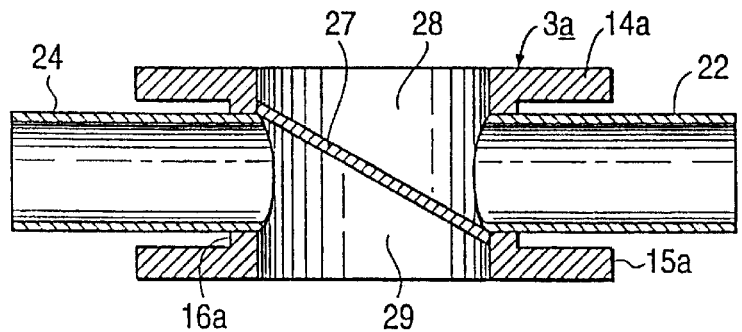
FIG. 6 shows a cross-sectional view of a connection saddle used in the second embodiment of the present invention.

A second embodiment of the invention, described with reference to FIGS. 5 and 6, utilizes a modified connector saddle 3a. This connector saddle 3a includes a top flange 14a which is secured to the outlet of the fuel-air mixing device 11, and a bottom flange 15a which is secured to the inlet of the intake manifold 12. A sidewall 16a connects between the top flange 14a and the bottom flange 15a. Inside the modified connector saddle 3a is provided a separation plate 27 spanning the inner space of the saddle in an inclined manner so as to form on opposing sides thereof a first chamber 28 and a second chamber 29. As with the connector saddle 3, extending chamber 28 has an outlet tube 22a extending radially outwardly therefrom, and the second chamber 29 has an inlet tube 24 extending radially inwardly thereto.

The use of either the connector saddle 3 or the modified connector saddle 3a is advantageous in that it allows the fuel-air mixing device 11 to remain directly above the intake manifold 12, and is thus especially adapted for use in a retrofit kit. However, the fuel-air bypass device of the present invention can operate equally well with other means of mounting between the fuel-air mixing device 11 and the intake manifold 12 so long as the mounting means does not create resistance to flow of the fuel-air mixture into and out of the fuel-air conduit 100. For example, in embodiments to be described later, a fuel-air conduit 200 will be described as being connected directly to the fuel-air mixing device 11 and the intake manifold 12 simply by the use of suitable flanges which allow the conduit 200 to be bolted or otherwise suitably fastened to the outlet of the fuel-air mixing device 11 and the inlet of the intake manifold 12.

Although the fuel-air conduit of the present invention is to be formed of a highly thermally conductive material, such as copper, and is to have a length and surface area sufficient to cause the liquid fuel to be gasified prior to entry into the cylinders and, preferably, prior to entry into the intake manifold 12, it is also possible to provide a heat exchanger 33 (see FIGS. 7 and 8) for enhancing the heating effect. In this regard, it is contemplated that the housing of heat exchanger 33 surrounds the conduit 100 and has a fluid inlet 35 for flow of fluid into a fluid reservoir 88, and a fluid outlet 34 for flow of the fluid out of the reservoir 88. The fluid used in the heat exchanger 33 can be any suitable heated fluid, such as the engine coolant or engine exhaust gases. This heat exchanger 33 is especially useful in eliminating a refrigerant effect which may occur at start-up in very cold climates. However, it is contemplated that, when the conduit 100 is formed of copper, such heat exchanger may be unnecessary as little or no refrigerant effect will take place.

Figure 7:
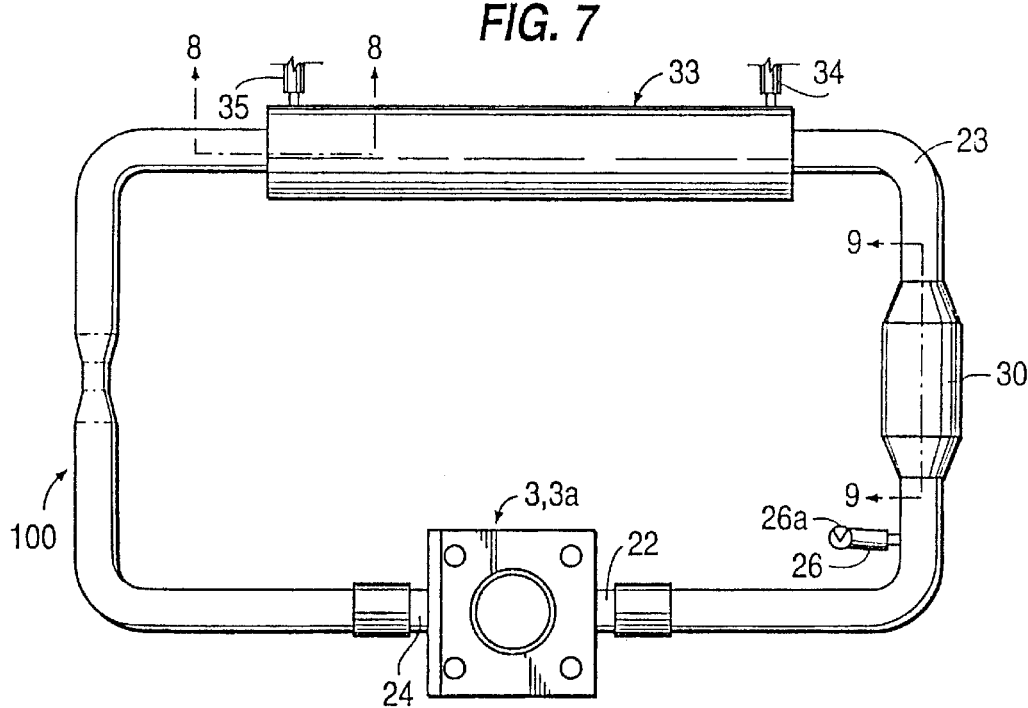
FIG. 7 shows a fuel-air bypass according to a third embodiment of the present invention.
Figure 8:
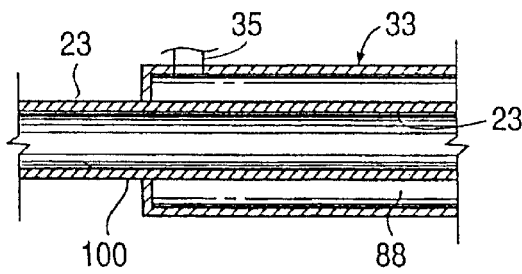
FIG. 8 shows a partial cross-sectional view of a heat exchanger used in the third embodiment of the present invention.
Figure 9:
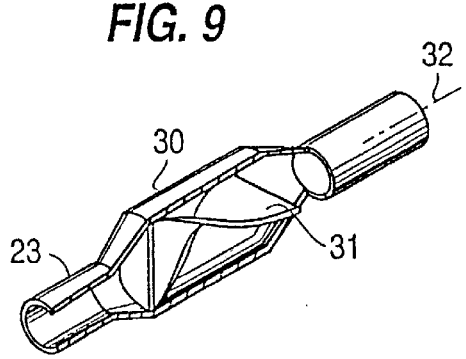
FIG. 9 shows a baffle arrangement for use in the third embodiment of the present invention.

As shown in FIGS. 7 and 9, an alternative to one or more of the venturis 25 is one or more helical baffle plates 31 concentrically oriented within a baffle chamber 30 about an axis 32. Such baffles will also act as turbulence creating means.

Figure 10:
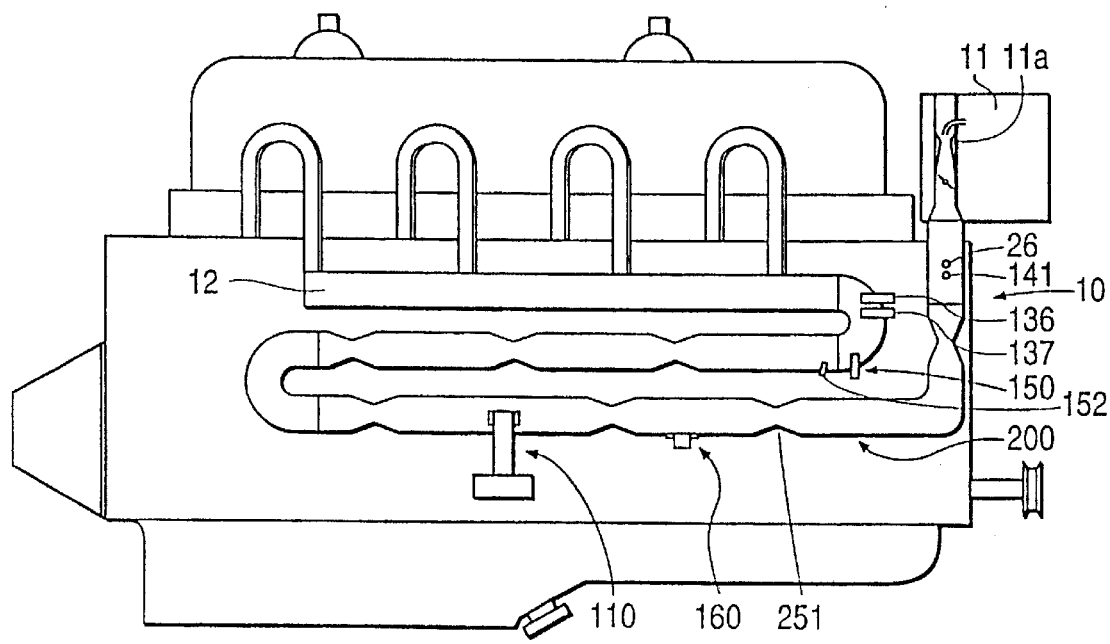
FIG. 10 shows a schematic elevation view of an internal combustion engine having a fuel-air bypass arrangement according to the present invention.

FIG. 10 schematically depicts a further embodiment of the present invention, wherein a fuel-air bypass conduit 200 is directly connected between a fuel-air mixing device 11 and an intake manifold 12. Also in FIG. 10 are schematically depicted the after-air supply tube 26, venturis 251, a liquid additive supply line 141, a temperature sensor 136, a fuel-air mixture sensor 137, a fuel injector 150, an ON/OFF type temperature sensor 152 for use with the fuel injector, a reparticulation reservoir 160 and a backfire safety device 110. Each of these features of the invention will be described in detail below.

Figure 11A:
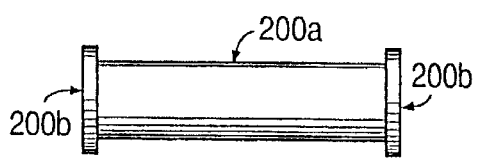
FIGS. 11–11F show elevation views of various individual sections which can be used to make up the fuel-air bypass conduit of the present invention.
FIG. 11G shows an end view of an end flange used to connect the various sections of the fuel-air bypass.
Figures 11B, 11C:
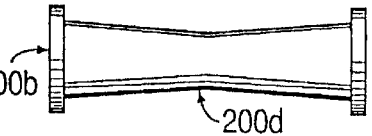
Figure 11D:
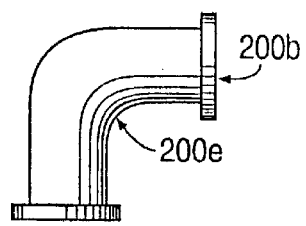
Figure 11E:
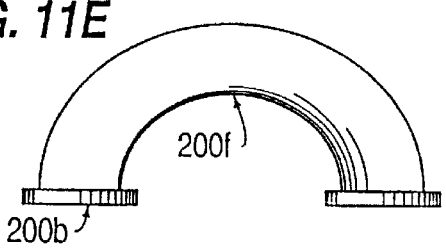
Figure 11F:
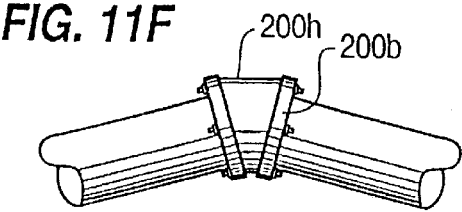
Figure 11G:
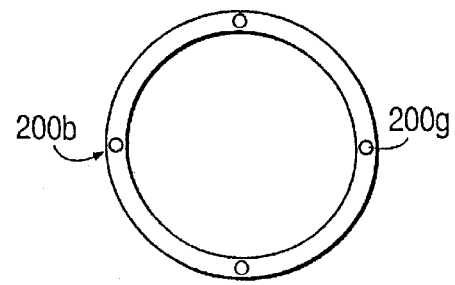

Next, although the fuel-air bypass conduit 100 or 200 can be formed as one continuous conduit, it is also contemplated that the bypass conduit can be formed of a number of interconnected smaller sections. Examples of these smaller sections are depicted in FIGS. 11A–11G. A straight conduit section 200a is shown in FIG. 11A with two end flanges 200b which can be connected to end flanges 200b of other conduit sections by bolts or other suitable fastening means. A gasket 200c to be interposed between the end flanges 200b of adjacent conduit sections is shown in FIG. 11B. Of course, however, any other suitable gasket or sealing means can be utilized. FIG. 11C shows a venturi section 200d, FIG. 11D shows an elbow section 200e, FIG. 11E shows a U-shaped section 200f, and FIG. 11F shows a wedge section 200h. FIG. 11G shows an end view of one of the end flanges 200b, and depicts the end flange 200b as having bolt holes 200g formed therein. Any number of various conduit configurations can be formed with the conduit sections shown in FIGS. 11A–11G. The precise configuration of the conduit 200 is itself of little importance, except to the extent that configurations having the least resistance to fluid flow are preferred.

Figure 12A:
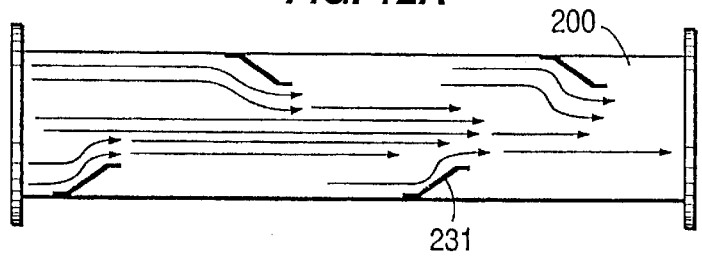
FIG. 12A shows an explanatory sectional view of a section of the fuel-air bypass having baffles.
Figure 12B:
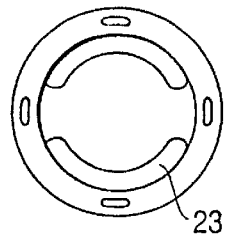
FIG. 12B shows an end view of the bypass section shown in FIG. 12A.

As an alternative to one or more of the venturis 25, 251, FIGS. 12A and 12B show a conduit 100 having radially inwardly protruding baffles 231 which, like the venturi, are effective to break up the boundary flow along the inner wall of the conduit, thereby creating turbulence and improving the mixing of the fuel-air mixture.

Figure 13:
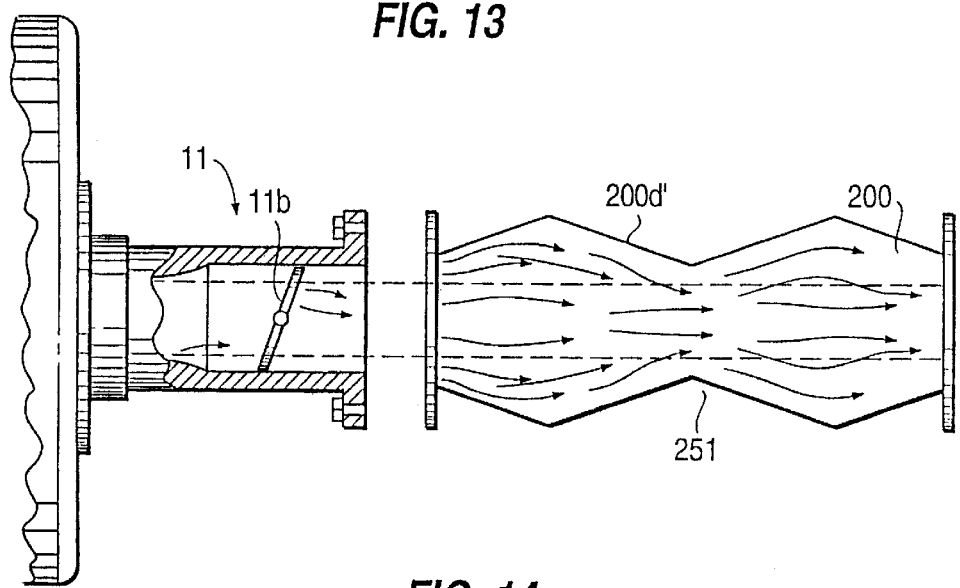
FIG. 13 shows a partially exploded sectional view of a venturi section of a fuel-air bypass connected to a fuel-air mixing device.
Figure 14:
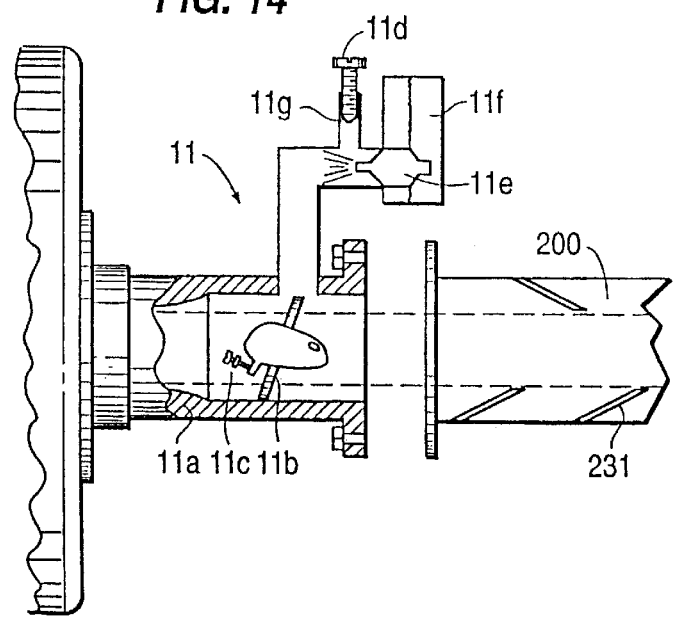
FIG. 14 shows a partially exploded sectional view showing a section of the bypass having baffles and being connected to a fuel-air mixing device.

FIGS. 13 and 14 show the characteristic of the present invention that the minimum cross-sectional area of the conduit is at least as large as the minimum cross-sectional area of the flow passage of the fuel-air mixing device 11. The minimum cross-sectional area of the flow passage of the fuel-air mixing device 11 is depicted in FIGS. 13 and 14 by dashed lines. As clear from FIG. 13, the minimum cross-sectional area of the throat of the fuel-air mixing device 11 is smaller than the throat of the venturi 251 of a conduit section 200d'. Similarly, FIG. 14 clearly shows that the throat of the fuel-air mixing device 11 is smaller in cross-sectional area than the passage between the baffles 231 provided in the conduit 200.

FIG. 14 illustrates a few details of a common fuel-air mixing device. In particular, the fuel-air mixing device includes a throttle 11b, an idle set screw 11c, an air screw 11d, an idling jet 11e, a fuel reservoir 11f, and an air intake 11g. Upon retrofitting of an internal combustion engine having this configuration with the fuel-air bypass of the present invention, it has been found necessary to back out the idle set screw 11c and the air screw 11d, because the interposition of the conduit 200 results in such an increase in the combustion efficiency of the fuel in the cylinders that the idle increases greatly and therefore must be reduced by throttle adjustment and increasing idle air flow (making the air-fuel mixture leaner).

Figure 15:
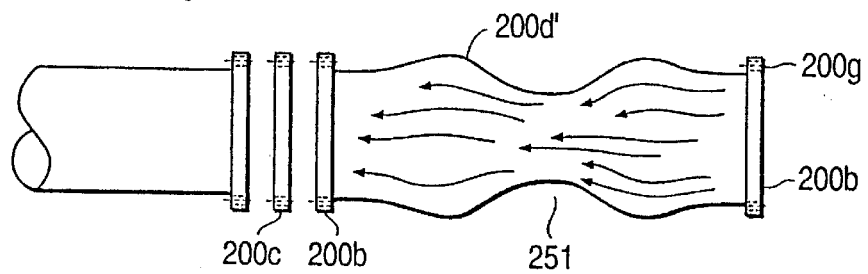
FIG. 15 shows an alternative form of venturi for use in the fuel-air bypass of the present invention.
Figure 16:
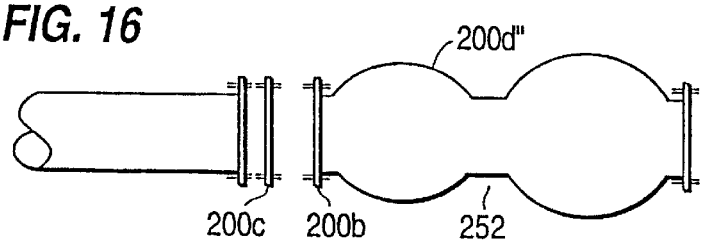
FIG. 16 shows yet another alternative form of venturi for use in the fuel-air bypass of the present invention.

FIG. 15 schematically depicts the air flow through the venturi section 200d', and also shows an exploded view of the interconnection between two conduit sections. The end flanges 200*b* are shown as having fastener holes 200*g* therethrough for interconnection by bolts or the like. An alternative style venturi section 200*d*" is shown in FIG. 16. This bulbous-shaped venturi also acts as a turbulence creating means for the fuel-air mixture flow.

Figure 17:
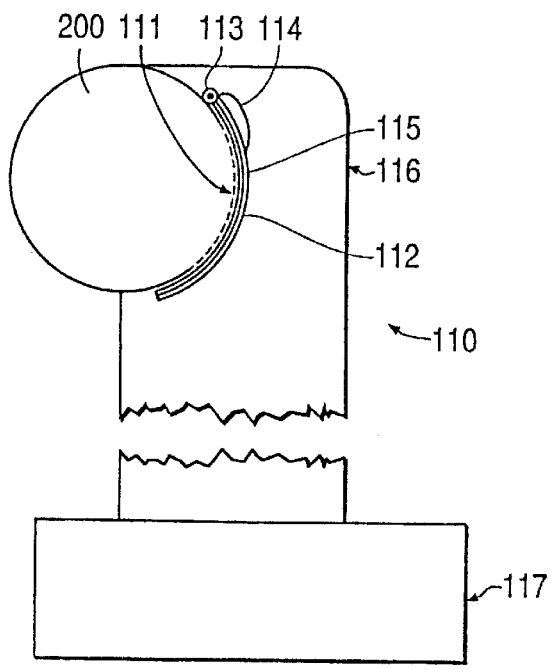
FIG. 17 shows a side elevation view of a backfire safety device for use with the fuel-air bypass of the present invention.
Figure 18:
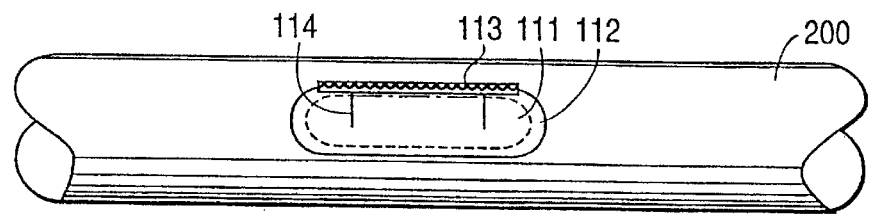
FIG. 18 shows a front elevation view of a portion of the backfire safety device shown in FIG. 17.

FIGS. 17 and 18 show a backfire safety device 110 connected to the fuel-air bypass conduit 200. The backfire safety device 110 includes a backfire port 111 which, as shown in FIG. 18, is preferably an elongated opening formed in the conduit 200, and a backfire port cover 112 pivotally connected to the conduit 200 by a backfire port cover hinge 113. A backfire port closure spring 114 is provided to bias the backfire port cover 112 into a closed state, and a cover gasket 115 is provided to seal the backfire port 111 when the port cover 112 is in the closed state. The backfire port 111 is connected to a pressure discharge absorbing canister 117 by a pressure discharge pipe 116. Preferably, the pressure discharge absorbing canister 117 will have a pressure absorbing medium disposed therein. With this backfire safety device 110, upon the occurrence of a pressure increase in the conduit 200 sufficient to overcome the biasing force of the closure spring 114, the backfire port cover 112 will be forced open to allow a pressure release into the pressure discharge pipe 116 to be absorbed in the pressure discharge absorbing canister 117.

Figure 19:
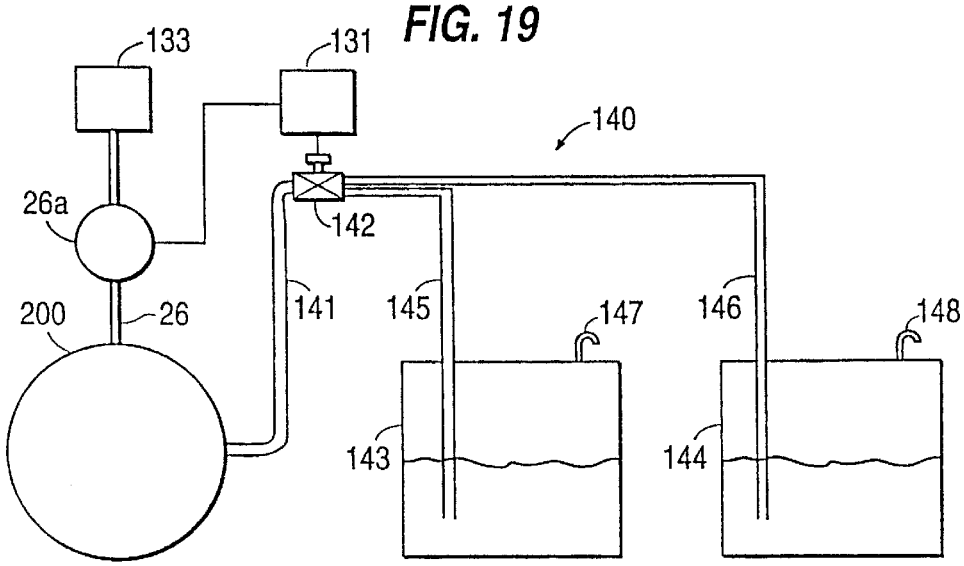
FIG. 19 shows a schematic view of a liquid additive induction system and an after-air control system for use with the fuel-air bypass of the present invention.

FIG. 19 schematically illustrates a liquid additive and after-air induction system for adding liquid additives, such as water and/or alcohol (ethanol), and after-air into the fuel-air mixture flowing through the conduit 200. First in this regard, it must be noted that the operation of the pistons in the cylinders of the internal combustion engine will create a vacuum in the bypass conduit 200, and that this vacuum is sufficient to draw liquid and after-air into the conduit 200 from their respective supply lines 141, 26. The liquid additive and after-air induction system 140 includes an after-air supply source 133, an after-air supply tube 26 leading from the after-air supply 133 to the conduit 200, and an after-air control valve 26*a* for controlling the amount of after-air flowing into the conduit 200. The after-air supply source 133 can be any suitable air supply source, but should preferably flow through an air cleaner, for example, the air cleaner 36 (FIG. 1). It is also contemplated that the after-air could be preheated in any suitable manner by, for example, passing the after-air through a heat exchanger to exchange heat with exhaust gases of the internal combustion engine.

The liquid additive and after-air induction system also includes a liquid additive supply line 141 leading into the conduit 200, and a valve (or valving arrangement) 142 for controlling flow into the liquid additive supply line 141, a water supply line 145 leading from a water supply reservoir 143 to the valve 142, and an alcohol supply line 146 leading from an alcohol supply reservoir 144 to the valve 142. The valve 142 can be any suitable valve which can control the flow of the water and alcohol in the situation where both water and alcohol are used, or, in a situation where only one of the water or alcohol is used, can be a control valve which simply controls flow of a single line. It is also contemplated that the alcohol supply in the supply reservoir 144 could be replaced by some other additive, such as benzene, or that a further supply reservoir could be added. Each of the reservoirs 143 and 144 is under atmospheric pressure due to the respective vents 147 and 148. The control valve 142 is controlled by an after-air and/or liquid additive induction control 131.

Figure 20:
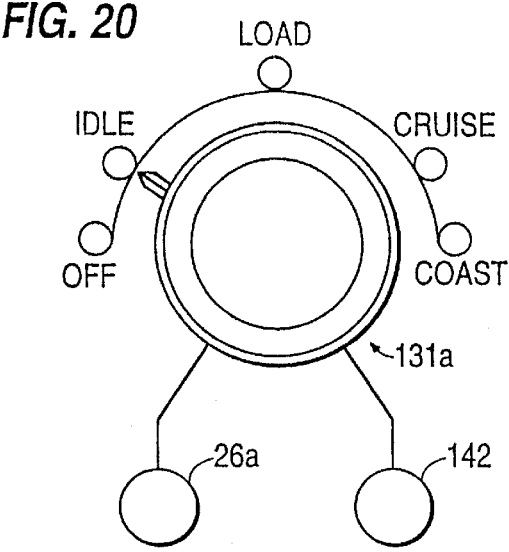
FIG. 20 shows one embodiment of an after-air control system which can be used in the arrangement shown in FIG. 19.

FIG. 20 shows a first example of the after-air and/or liquid additive induction control 131. In this arrangement, a manual control knob 131*a* is provided to allow for manual control of the after-air control valve 26*a* and the liquid additive control valve 142. Although an electronic control scheme can be used in this regard to electronically couple the manual control knob 131*a* to the valves 26*a* and 142, a physical interconnection by way of a wire and/or linkage connection is contemplated. This manual version of the after-air and/or liquid additive induction control 131 is contemplated for use by race car drivers, truck drivers or other individuals who would have the necessary desire and experience to control an internal combustion engine in this manner.

Figure 21:
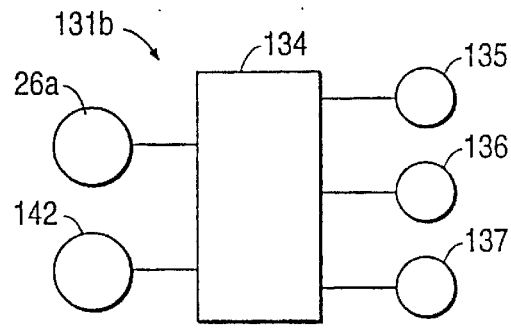
FIG. 21 shows another embodiment of the after-air control system which can be used in the arrangement shown in FIG. 19.

However, for passenger automobiles, it is contemplated that an automatic after-air and/or liquid additive induction control 131 would be used. Such automatic control 131*b* is shown in FIG. 21. This automatic control could utilize a separate computer 134 or the main computer of today's passenger automobiles. Various sensors, such as a tachometer (or other speed sensing means) 135, a temperature sensor 136 and a fuel-air mixture sensor 137, will provide sensing input into the computer 134 to allow the computer 134 to control the valves 26*a* and 142 in a suitable manner. The ordinary artisan will understand the manner of controlling the valves 26*a* and 142 on the basis of the sensor inputs from the sensors 135, 136 and 137 to input the proper amounts of after-air and liquid additives. This can be determined by minor amounts of experimentation. Therefore the computer 134 can be properly programmed to suitably control the valves 26*a* and 142 on the basis of the sensor inputs. Fuel-air mixture sensors are themselves well known and are available from various companies, including Fuel Management Systems of Mundelien, Ill.; Automotive Controls Corporation of Brantford, Conn.; and B.D E. Limited of Minnesota.

With regard to the control of the after-air control valve 26*a*, the significantly improved efficiency of the combustion of the fuel-air mixture when the fuel-air bypass of the present invention is provided enables the fuel-air mixture to be much leaner and, accordingly, a quantity of after-air can be quite significant. Although the exact quantity of after-air must be determined experimentally for each particular engine and each particular configuration of the fuel-air bypass device, it can generally be expected that the after-air volumetric capacity can be 50% to 100% of the volumetric throttle capacity.

The purpose of the water and/or alcohol induction into the fuel-air flow in the conduit 200 is to allow for the use of a higher compression engine than would otherwise be possible with unleaded gasolines, and to otherwise improve the engine performance and efficiency. In particular, the water induced into the fuel-air mixture will slow the burning of the mixture, and therefore slow the advance of the flame front, to thereby prevent knocking in the same manner that was previously accomplished by the provision of tetryl ethyl lead in gasoline. Although water induction has been previously attempted, it has never been successful for long-term running of an internal combustion engine because the water could never be properly atomized and mixed with the fuel-air mixture in prior art close-coupled systems (i.e., systems in which the fuel-air mixing device 11 is coupled directly to the intake manifold 12). The length, cross-sectional area, heat conduction capacity, and turbulence creating capacity of the fuel-air bypass conduit device of the present invention enables the water induced into the conduit 200 to be very finely atomized and properly mixed in the fuel-air mixture so that a mixture is readily combusted in the cylinders. In addition to slowing the burning of the fuel-air mixture, the water added thereto is effective to itself perform work in the cylinder due to the fact that water expands approximately 19,000 times when it flashes into steam. The water also will interact with carbon, and thus has a purging effect in the combustion chamber to prevent carbon build-up.

Because it is highly undesirable to have any water present in the cylinders when the engine is not running, it is contemplated in the present invention that the control valve 142 will be controlled so that either less water or no water will be induced into the conduit 200 during idling. Rather, during idling, the water induced into the conduit 200 will be replaced by alcohol from the alcohol reservoir 144. The alcohol has a similar effect to the water in that it also prevents knocking in a high compression engine by slowing burning of the fuel-air mixture. However, it is desired to use water rather than alcohol as the additive when possible, because alcohol is much more costly an additive and also cannot be as readily replenished.

Figure 22:
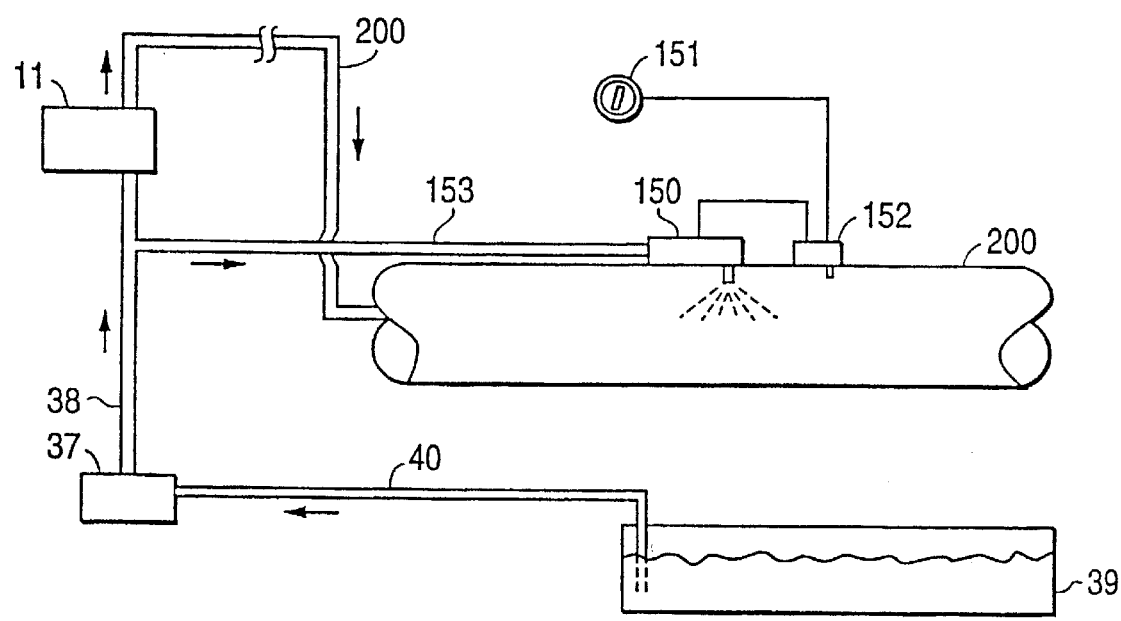
FIG. 22 shows a schematic view of a fuel injection arrangement for use in the fuel-air bypass of the present invention.

FIG. 22 shows a system for providing an initial fuel injection burst into the conduit 200, preferably at a location in the conduit near the inlet to the intake manifold 12. This initial injection of fuel allows for a quicker turn-over of the engine, which is otherwise slowed due to the large capacity of the conduit 200. Although various systems for so providing this initial fuel injection burst may be contemplated, a preferred embodiment of the present invention includes a fuel injector 150 mounted to the conduit 200 and injecting directly thereinto, a temperature sensor (which is preferably an on/off switch-type sensor) 152 and a fuel injector supply line 153. The fuel injector supply line 153 branches off from a fuel line 38 leading from a fuel pump 37 to the fuel-air mixing device 11. The fuel pump 37 is supplied by a fuel reservoir 39 via a fuel supply line 40. The automobile ignition switch 151 is connected to the on/off temperature sensor 152 which, in turn, is connected to the fuel injector 150. When the ignition switch 151 is turned on, and the temperature sensor 152 is also switched "on", the fuel injector 150 will be electrically actuated. The temperature sensor 152 is placed in an "on" condition when it senses a temperature in the conduit 200 below a reference temperature. The reference temperature is a temperature above which an initial fuel injection burst is unnecessary to cause quick starting of the engine. This fuel injection system is used especially when there is no acceleration pump.

Figure 23:
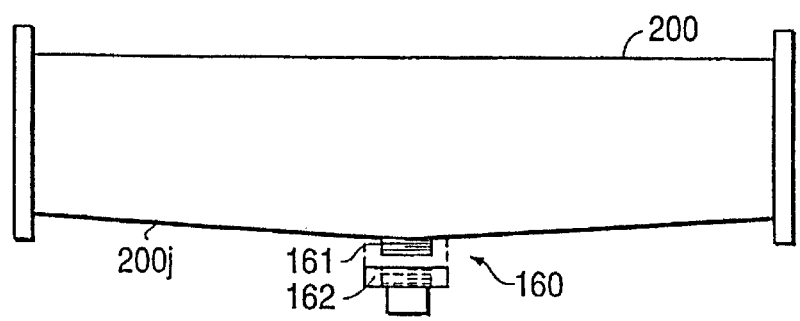
FIG. 23 shows a partially sectional view of a portion of the fuel-air bypass having a reparticulation reservoir.

FIG. 23 shows a reparticulation reservoir, one or more of which are preferably located at the physically lowest portion of the bypass conduit to collect any liquid fuel therein in the case of flooding of the engine. The reservoirs collect the excess liquid fuel caused by flooding and reduce the surface area of the liquid to the air flow. This provides for a more gradual re-absorption of this liquid into the fuel-air flow than would be the case where the liquid fuel is laying across a large surface area, such as pooled in the bottom of an intake manifold. In the preferred embodiment shown in FIG. 23, the reparticulation reservoir is formed by an externally threaded reparticulation fitting 161 to which an internally threaded reparticulation nut 162 is secured. This removable reservoir arrangement allows for a drastically flooded situation to be remedied by removal of the reparticulation nut 162 to drain the excess liquid fuel. However, it is also contemplated that the reparticulation reservoir 160 can be in the form of a simple dimple or other outward deformation in the bottom of the conduit 200, or in any other suitable form to carry out the above-discussed function. One or more of the reparticulation reservoirs 160 can be provided in the bypass conduit 200. In addition, in a bypass conduit 200 formed of multiple conduit sections, a separate reparticulation section 200j can be utilized.

The fuel-air bypass device of the present invention can be mounted in an engine compartment or other enclosed environment in any suitable manner, so long as it is interposed between the fuel-air mixing device and the intake manifold of an internal combustion engine. The engine can be a liquid-cooled engine or an air-cooled engine, and also can be a single cylinder engine such as a lawnmower engine, or a multiple cylinder engine such as used in automobiles. However, it must be recognized that the elongated fuel-air bypass conduit 100 or 200 must be exposed to considerable heat and it is generally contemplated that the heat will be the heat produced by the internal combustion engine itself. It has been found that the heat produced in the engine compartment of an automobile is more than sufficient to enable the bypass conduit device of the present invention to sufficiently heat the fuel-air mixture prior to its entry into the cylinders so that the fuel of the mixture is gasified before entering the cylinders and, preferably, before entering the intake manifold.

The precise configuration of the bypass conduit can be varied as necessary for the particular engine arrangement and/or the particular engine compartment arrangement. Examples of three exemplary bypass conduit configurations 200A, 200B and 200C are depicted in plan view in FIGS. 29A, 29B and 29C, respectively.

Figure 27:
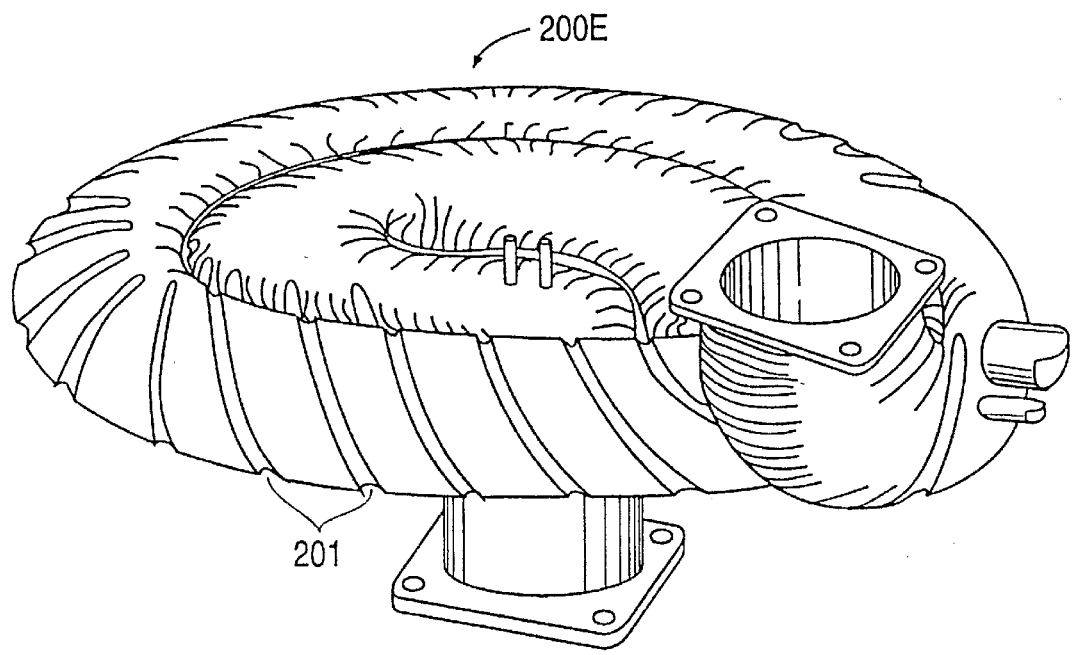
FIGS. 27 and 28 show particular arrangements of fuel-air bypasses according to the present invention.
Figure 28:
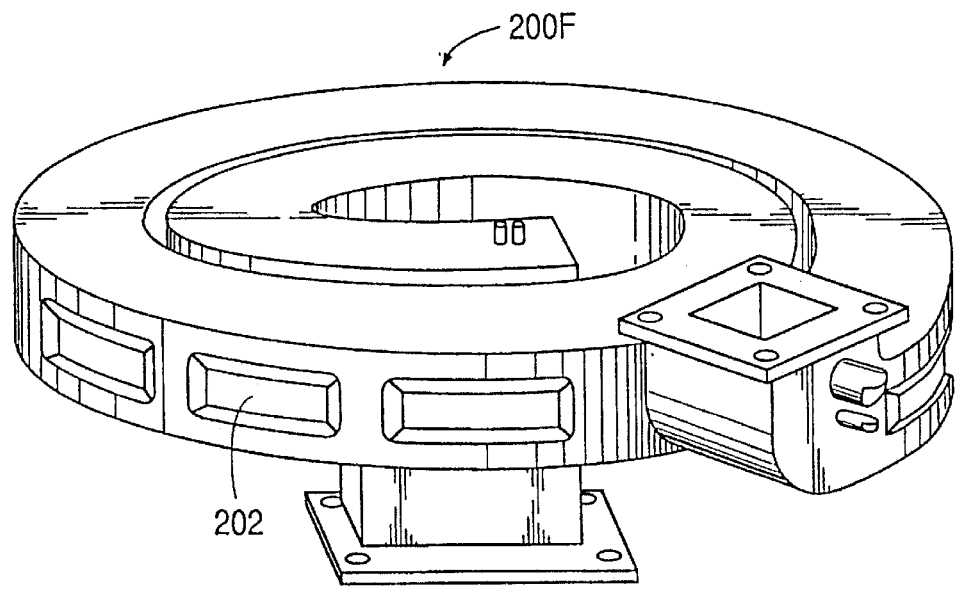

In addition, the bypass conduit can have any suitable cross-sectional shape such as, for example, a circular cross-sectional shape as depicted in FIG. 27, or a square or rectangular cross-sectional shape as depicted in FIG. 28. It is contemplated that the turbulence creating means of the bypass device can be in the form of helical-like inward deformations 201. These deformations 201 can be provided about the entire periphery of a cross-section of the conduit, but, in the coil-like configuration of the conduit 200E in FIG. 27, it is possible to provide the deformations 201 only along the outer circumference of the coil-shaped conduit, and such arrangement will sufficiently mix the fuel-air mixture due to the centrifugal force of the fuel-air mixture flowing through the coil-shaped conduit.

As shown in FIG. 28, it is contemplated that rectangular-shaped inward deformations 202 can be provided in the outer periphery of a coil-shaped conduit 200F, and that such rectangular-shaped deformations will also provide an adequate turbulence creating means.

FIG. 26 shows a fuel-air bypass conduit 200D mounted in the engine compartment 220 of an automobile. In this particular example, the conduit 200D is mounted to the inside wall of a fender 225, and has its outlet end connected to the intake manifold 222 of the engine 221 via a flexible conduit 223. The inlet of the conduit 200D is, of course, connected to the fuel-air mixing device 224. This exemplary mounting configuration shown in FIG. 26 is only one of many configurations possible.

It is preferred that the mounting of the conduit to the engine or engine compartment walls will be somewhat flexible so as to allow for any thermal expansion and contraction of the conduit. FIGS. 24 and 25 show two examples of how the conduit 200 can be mounted to the engine or engine compartment wall. In particular, a conduit mounting tab 210 can be either welded to the conduit 200 (as shown in FIG. 24), or attached to the conduit 200 by adjustable conduit mounting clamps 212 (as shown in FIG. 25). A conduit mount 211 which is secured in any suitable manner to the engine or engine compartment wall can then be pivotally attached to the conduit mounting tab 210 by a bolt or other suitable pivot pin.

Actual tested examples of the present invention will now be described.

EXAMPLE 1

A 1½ inch O.D. tubular steel conduit was interposed between the carburetor and intake manifold of a 350 cubic inch engine in a 1968 Buick. As with all of the present examples, the conduit was a type L conduit having a wall thickness of approximately ⅟16 inch. The turbulence creating means utilized in this and the following examples comprised venturis spaced along the conduit. This bypass device was tested with conduits of five different lengths: 3 feet, 6 feet, 9 feet, 12 feet, and 20 feet. With each of these arrangements, the vehicle was able to perform at a full range of conditions and speeds up to almost 100 miles per hour, and the throttle response was almost instantaneous for all of the five configurations. However, the steel conduit, at times, demonstrated considerable sweating at cold start-up due to the refrigerant effect. That is, when the fuel was introduced into the air stream, it took heat from the steel conduit faster than the steel could absorb heat and transfer it to the fuel-air stream. This condition of slow conduction by the steel conduit causes freeze-up in cold winter temperatures, and ice or frost build-up on the inside of the conduit will choke off the air supply to the engine. Also, frost build-up on the outside of the conduit will prevent any appreciable heat absorption from taking place.

EXAMPLE 2

In a 1977 Buick with a 403 cubic inch engine, a 1½ inch O.D. bypass conduit was interposed between the carburetor and the intake manifold. The configuration of the conduit was somewhat like that shown in present FIG. 29B. This time, rather than a steel conduit, the conduit was copper, and had a length of 12 feet. With this arrangement of the fuel-air bypass device, it was found that no sweating occurred, thereby demonstrating the superiority of copper conduit over steel. However, the 1½ inch O.D. copper conduit proved unable to supply a sufficient volumetric amount of the fuel-air mixture to meet the engine's power needs, thereby causing a significant drop in performance relative to the non-retrofitted engine and a drop in average fuel economy to approximately 9 miles per gallon with a top speed of approximately 45 miles per hour.

EXAMPLE 3

This example of the fuel-air bypass device was substantially identical to that of Example 2, except that a 2 inch O.D. copper conduit was used which, having a 12 foot length, provided the conduit with over 6 square feet of heating surface area. In this arrangement, normal power was restored to the engine relative to Example 2, and the engine performed over a full range of speeds and conditions.

The success of this test, compared with that of the test in Example 2, showed that the flow capacity and resulting resistance characteristic of the conduit directly affect the power that can be developed and the fuel mileage.

Further testing of this example demonstrated that the acceleration pump normally used with automobile engines was no longer needed. Normal acceleration was achieved without the acceleration pump (i.e., by controlling only the carburetor throttle), and there was found to be no hesitation in the acceleration.

In this example, the fuel mileage attained increased from an average of 15 to 16 miles per gallon with the non-retrofitted engine to an average of 22 to 24 miles per gallon with the fuel-air bypass device of the present invention.

The exhaust emissions were tested for this arrangement and showed, at an idle speed of 450 rpms, a hydrocarbon output of 26 ppm and a carbon monoxide output of only 0.02%. At an engine speed of 2000 rpms, the hydrocarbon output was 10 ppm and the carbon monoxide output was 0.01%.

EXAMPLE 4

In a 1982 Toyota Corona 4-cylinder engine, a fuel-air bypass device having a 1½ inch O.D. copper conduit with a length of 12 feet was installed. The configuration of the conduit was somewhat like that shown in FIG. 29C. This arrangement also performed well over a full range of speeds and conditions. The average fuel mileage with the fuel-air bypass device installed was 36 to 38 miles per gallon, whereas the original factory estimate miles per gallon for this engine was 25 miles per gallon.

EXAMPLE 5

In a 1984 Chevrolet pickup with a 350 cubic inch engine, a fuel-air bypass device having a 2 inch O.D. copper conduit with a length of 12 feet was installed. In addition, the device used in this example was provided with water induction. Again, the engine ran without problems over a full range of engine speeds and conditions. Also, the exhaust emissions were tested to show that the hydrocarbon output was 9 ppm, and the carbon monoxide output was only 0.03% at an engine speed of 2521 rpms. This arrangement was also found to run and accelerate properly without an acceleration pump.

EXAMPLE 6

In a Briggs and Stratton 5 horsepower air-cooled lawnmower engine (Model 30202), a fuel-air bypass device having a ¾ inch O.D. copper conduit with a length of 3 feet was installed. The configuration was similar to that shown in FIG. 29C. The engine ran well over a normal range of engine speeds and, when initially installed, the engine speed increased by over 100%.

Although various embodiments of the invention and of various features of the invention have been described in detail, the above description should be understood as being only exemplary of the invention. Therefore, it will be understood that various modifications of the construction and operation of the above-described embodiments will be apparent to those of ordinary skill in the art. Accordingly, the scope of the present invention is to be limited only by the appended claims.

We claim:

1. An apparatus for use with an internal combustion engine including a fuel-air mixing device with an inlet port and an outlet port, an intake manifold with an inlet port operably communicated with the outlet port of the fuel-air mixing device and at least one outlet port, and at least one cylinder communicated with the at least one outlet port of the intake manifold, said apparatus comprising:

an elongated bypass conduit operably coupled between the outlet port of the fuel-air mixing device and the inlet port of the intake manifold for passing a fuel-air mixture from the fuel-air mixing device to the intake manifold;

turbulence creating means for creating turbulence in the fuel-air mixture flowing through said elongated bypass conduit;

wherein said elongated bypass conduit is formed of a thermally conductive material; and wherein said elongated bypass conduit has a length, an exterior surface area and a thermal conductivity sufficiently great so as to constitute a means for causing liquid fuel introduced through the fuel-air mixing device to change from a liquid state to a gaseous state prior to entry into the at least one cylinder without requiring said elongated bypass conduit to be connected to a heat exchanger.

2. An apparatus as recited in claim 1, wherein said elongated bypass conduit is formed of copper.

3. An apparatus as recited in claim 1, wherein
said turbulence creating means comprises a plurality of baffles provided in said elongated bypass conduit successively along the length thereof.

4. An apparatus as recited in claim 3, wherein said baffles protrude inwardly from a conduit wall of said elongated bypass conduit.

5. An apparatus as recited in claim 3, wherein
said baffles comprise helical plates respectively mounted along the length of said elongated bypass conduit.

6. An apparatus as recited in claim 1, wherein
said elongated bypass conduit is circular in cross section.

7. An apparatus as recited in claim 1, wherein
said elongated bypass conduit is rectangular in cross section.

8. An apparatus as recited in claim 1, wherein
said fuel-air bypass conduit is formed of a plurality of conduit sections longitudinally successively secured together.

9. An apparatus as recited in claim 1, further comprising a compartment for enclosing said elongated bypass conduit and the internal combustion engine.

10. An apparatus as recited in claim 9, further comprising a heat exchanger operably coupled to said elongated bypass conduit and operably couplable to a heat source.

11. An apparatus as recited in claim 1, further comprising a heat exchanger operably coupled to said elongated bypass conduit and operably couplable to a heat source.

12. An apparatus for use with an internal combustion engine including a fuel-air mixing device with an inlet port and an outlet port, an intake manifold with an inlet port operably communicated with the outlet port of the fuel-air mixing device and at least one outlet port, and at least one cylinder communicated with the at least one outlet port of the intake manifold, said apparatus comprising:

an elongated bypass conduit operably coupled between the outlet port of the fuel-air mixing device and the inlet port of the intake manifold for passing a fuel-air mixture from the fuel-air mixing device to the intake manifold;

turbulence creating means for creating turbulence in the fuel-air mixture flowing through said elongated bypass conduit;

wherein said elongated bypass conduit has a length, an exterior surface area and a thermal conductivity sufficiently great so as to constitute a means for causing liquid fuel introduced through the fuel-air mixing device to change from a liquid state to a gaseous state prior to entry into the at least one cylinder; and wherein said elongated bypass conduit is formed of copper.

13. An apparatus for use with an internal combustion engine including a fuel-air mixing device with an inlet port and an outlet port, an intake manifold with an inlet port operably communicated with the outlet port of the fuel-air mixing device and at least one outlet port, and at least one cylinder communicated with the at least one outlet port of the intake manifold, said apparatus comprising:

an elongated bypass conduit operably coupled between the outlet port of the fuel-air mixing device and the inlet port of the intake manifold for passing a fuel-air mixture from the fuel-air mixing device to the intake manifold;

turbulence creating means for creating turbulence in the fuel-air mixture flowing through said elongated bypass conduit;

wherein said elongated bypass conduit is formed of a thermally conductive material;

wherein said elongated bypass conduit has a length, an exterior surface area and a thermal conductivity sufficiently great so as to constitute a means for causing liquid fuel introduced through the fuel-air mixing device to change from a liquid state to a gaseous state prior to entry into the at least one cylinder; and wherein said elongated bypass conduit comprises a conduit wall, and a plurality of longitudinally spaced apart portions of said conduit wall are deformed inwardly toward an axial center of said conduit wall, said inwardly deformed portions of said conduit wall constituting said turbulence creating means.

14. An apparatus for use with an internal combustion engine including a fuel-air mixing device with an inlet port and an outlet port, an intake manifold with an inlet port operably communicated with the outlet port of the fuel-air mixing device and at least one outlet port, and at least one cylinder communicated with the at least one outlet port of the intake manifold, said apparatus comprising:

an elongated bypass conduit operably coupled between the outlet port of the fuel-air mixing device and the inlet port of the intake manifold for passing a fuel-air mixture from the fuel-air mixing device to the intake manifold;

turbulence creating means for creating turbulence in the fuel-air mixture flowing through said elongated bypass conduit;

wherein said elongated bypass conduit is formed of a thermally conductive material; and wherein said elongated bypass conduit comprises a conduit wall, and at least one reparticulation reservoir is provided in a bottom portion of said elongated bypass conduit, said at least one reparticulation reservoir comprising a liquid-collection container fluidically communicated with an interior of said elongated bypass conduit and projecting downwardly from said conduit wall in a direction away from said elongated bypass conduit.

15. An apparatus as recited in claim 14, wherein
said liquid-collection container projects downwardly from a physically lowest point of said elongated bypass conduit.

16. An apparatus as recited in claim 14, wherein said elongated bypass conduit has a length, an exterior surface area and a thermal conductivity sufficiently great so as to constitute a means for causing liquid fuel introduced through the fuel-air mixing device to change from a liquid state to a gaseous state prior to entry into the at least one cylinder.

17. A method comprising the steps of:
mixing fuel and air to create a fuel-air mixture;
feeding the fuel-air mixture to at least one combustion cylinder of an internal combustion engine;

prior to entry of the fuel-air mixture into the at least one combustion cylinder, gasifying the fuel of the fuel-air mixture by causing the fuel-air mixture to pass through an elongated bypass conduit which is formed of a thermally conductive material and is heated by heat from the internal combustion engine;

creating turbulence of the fuel-air mixture in the elongated bypass conduit; and supplying alcohol into the elongated bypass conduit to be mixed with the fuel-air mixture prior to entry of the fuel-air mixture into the at least one cylinder.

18. A method comprising the steps of:

mixing fuel and air to create a fuel-air mixture;

feeding the fuel-air mixture to at least one combustion cylinder of an internal combustion engine;

prior to entry of the fuel-air mixture into the at least one combustion cylinder, gasifying the fuel of the fuel-air mixture by causing the fuel-air mixture to pass through an elongated bypass conduit which is formed of a thermally conductive material and is heated by heat from the internal combustion engine;

creating turbulence of the fuel-air mixture in the elongated bypass conduit; and supplying water and alcohol into the elongated bypass conduit to be mixed with the fuel-air mixture prior to entry of the fuel-air mixture into the at least one cylinder.

* * * * *